No. 873,127. PATENTED DEC. 10, 1907.
G. A. HOLMES.
SNAP FASTENER.
APPLICATION FILED MAY 11, 1906.

WITNESSES:
L. S. Casey
F. H. Bliss

INVENTOR:
George A. Holmes
by Donald Campbell
his Attorney

UNITED STATES PATENT OFFICE.

GEORGE A. HOLMES, OF NEWTON CENTER, MASSACHUSETTS, ASSIGNOR TO UNITED STATES FASTENER COMPANY, OF BOSTON, MASSACHUSETTS, A CORPORATION OF MAINE.

SNAP-FASTENER.

No. 873,127.        Specification of Letters Patent.        Patented Dec. 10, 1907.

Application filed May 11, 1906. Serial No. 316,248.

*To all whom it may concern:*

Be it known that I, GEORGE A. HOLMES, a citizen of the United States, and resident of Newton Center, Massachusetts, have invented a new and useful Improvement in Snap-Fasteners, of which the following, taken in connection with the accompanying drawings, is a specification.

My invention relates to fasteners, and more particularly to separable fasteners of that class now known as snap fasteners.

My improvements relate to a novel form of such fastener and of certain novel features and specific means by which such features are provided.

I will first describe a fastener embodying my improvements and then point out the novel features in the claims.

Figure 1:
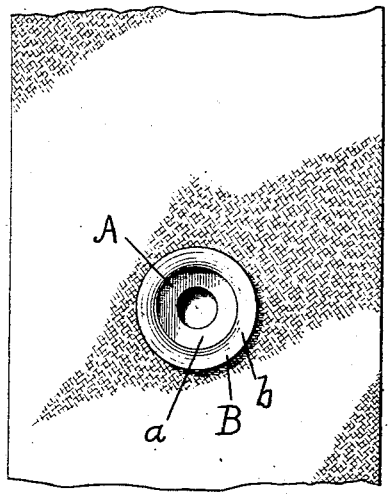
Figure 2:
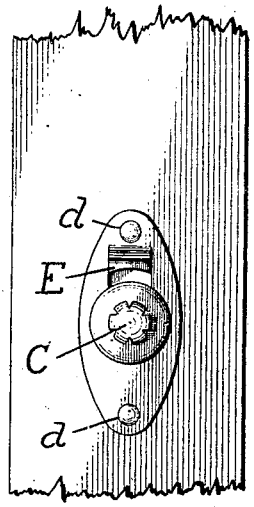
Figure 3:
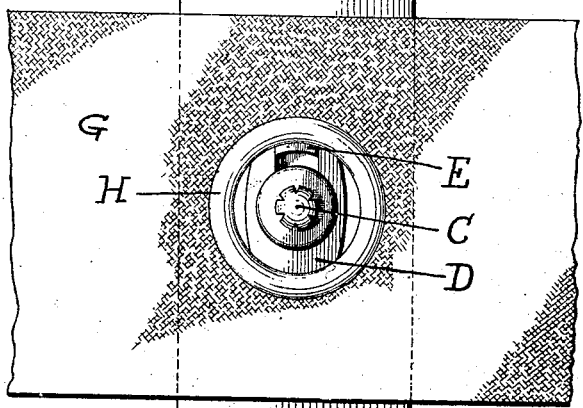
Figure 4:
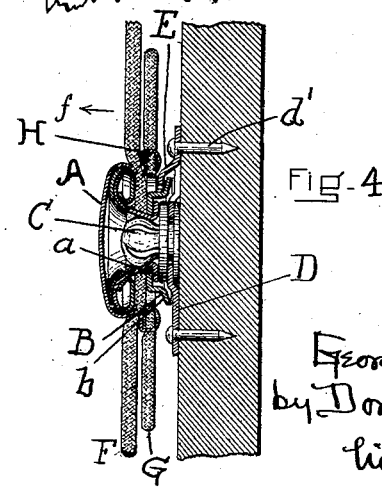

In the accompanying drawings forming part of this specification, Figure 1 is a face view of a piece of fabric to which is secured the socket member of a snap fastener embodying my invention. Fig. 2 represents a complementary member comprising a stud adapted to engage with a socket shown in Fig. 1. Fig. 3 is the same thing that is shown in Fig. 2 having superimposed upon it a layer of fabric formed with an aperture, and with a gromet secured in the aperture. Fig. 4 represents a cross section of the socket of Fig. 1 engaged with the stud of Fig. 2, but with the intermediate layer of fabric having a gromet, as shown in Fig. 3, interposed between the ball and the socket member.

Similar letters of reference designate corresponding parts in the several figures of the drawing.

Fasteners of this class usually have a socket member with a contracted mouth, and a ball or stud member with an enlarged head adapted to be snapped into and out of the contracted mouth of the socket. One of the members is fastened to one layer of fabric or other material, and the other member to another layer or part, the fastener as a whole forming a means of separably and temporarily engaging the two layers of fabric. Sometimes it is desirable to use this class of fastener for holding carriage or vehicle curtains or canopies, and to this use I have shown my invention applied. In such cases one of the members will be secured to the frame or woodwork of the canopy by nails, rivets or the like. For convenience I have selected the stud member to be so connected.

Frequently it is desirable to attach more than one layer of fabric over a given stud, and my invention is one which covers this, an extra layer of material being slipped over the stud before the socket is put in place.

The strain due to the action of wind and other causes which comes upon this class of device is sometimes very great so as to cause the liability of derangement or detachment. This I have precluded by a novel form of automatic locking device which is one of the features of invention of the device shown in the drawings.

The socket member is indicated at A in Figs. 1 and 4. It may be built up in a well known manner from sheet metal components one of which, the eyelet, is passed through a hole in the fabric or material and clenched on the other side. In the fastener embodying my invention this eyelet *a* is clenched over a washer of unusual construction. This washer is indicated at B. It is dished or dish-shaped so as to give the effect of a rim that stands out from or is offset from the plane of the fabric to which the socket is secured. This rim is indicated at *b*, and its function will appear hereinafter.

The stud member C may be, generally speaking, of a well known variety, for example, the bird-cage spring stud. As a means for securing the stud to woodwork or other frame work, I have riveted the same as best seen in Fig. 4, upon a metallic plate D, the eyelet of the stud passing through said plate clenched within the head of the stud.

The plate B may be given the two functions hereinafter recited instead of employing two different plates for that purpose. Firstly it is extended as at *d d* to a point where holes for rivets, screws or nails may be formed. These holes are shown at Fig. 4 as employed in connection with nails *d'* for attaching the stud member to woodwork. A locking projection is provided for the stud member which is adapted to engage under the rim of the dish-shaped washer B of the socket. This locking projection is shown as a tongue or claw of metal struck upwardly from the metal of the plate D as shown at E.

In attaching the stud and socket members the rim $b$ of the socket washer B will first be hooked under the locking projection E of the stud and the socket will then be swung over until by pressure it may be forced over the bulbous head of the stud and thus snapped into place. When so engaged it will be obvious that the members may only be disengaged by an upward pull on the edge F of the fabric to which the socket is attached. On the other hand a strain or pull in the direction of the arrow $f$ will prevent detachment of the members because of the engagement with the rim $b$ of the socket washer B by the locking projection E of the stud. As practically the whole of the strain that would come in practical use of such a member would be in the direction of the arrow $f$ the device would effectually prevent an accidental detachment. Where another layer of fabric is to be secured over the same stud it may be done by providing a gromet H, such as that shown in the fabric G in Fig. 3. When this is slipped over the head of the stud, and before attachment of the socket it will be precluded from accidental displacement for the same reason that the fabric to which the socket is secured is precluded from accidental detachment.

Figure 5:
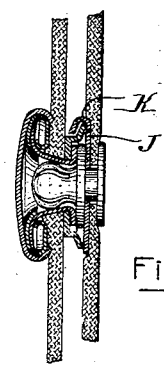

Fig. 5 shows a modification in which the metallic plate D having rivet or nail holes is replaced by a plate J inserted between the stud and its attaching eyelet before the latter are secured through an aperture in the fabric. The plate J differs from the plate D in that it has one of its edges extended upwardly and around into a hook K which is the equivalent of the offset projection E.

What I claim as my invention and desire to secure by Letters Patent is:

1. In a snap fastener, a socket member and a ball member, one of the members having an offset inwardly extending locking projection, and the other a dished washer its offset rim adapted at any point of said rim to engage said locking projection, in the act of engaging said members.

2. In a snap fastener, a socket member and a ball member, one of the members having an offset inwardly extending locking projection, and the other a dished washer its offset rim adapted at any point of said rim to engage said locking projection, in the act of engaging said members; said locking projection being formed on a plate that is attached at two or more points to its base.

3. In a snap fastener, a socket member and a ball member, one member having a laterally extended plate which has a plurality of attaching places as nail-holes said plate also having an inwardly projecting offset locking projection; the other member having a coöperating offset projection consisting of a circular disk with offset rim.

In testimony whereof, I have signed my name to this specification in the presence of two subscribing witnesses, on this eighth day of May A. D., 1906.

GEORGE A. HOLMES.

Witnesses:
   A. H. FLANNERY,
   FRED JOY.